Oct. 30, 1928.

G. J. LEXA 1,689,442

SOLENOID BRAKE

Filed April 14, 1926   2 Sheets-Sheet 1

Inventor
George J. Lexa.
By Bottum Hudnall
Lecher & McNamara
Attorneys

Oct. 30, 1928.

G. J. LEXA 1,689,442

SOLENOID BRAKE

Filed April 14, 1926   2 Sheets-Sheet 2

Inventor
George J. Lexa.

By Bottum, Hudnall,
Lecher and McNamara Attorneys

Patented Oct. 30, 1928.

1,689,442

UNITED STATES PATENT OFFICE.

GEORGE J. LEXA, OF WAUWATOSA, WISCONSIN, ASSIGNOR TO HARNISCHFEGER CORPORATION, OF MILWAUKEE, WISCONSIN, A CORPORATION OF WISCONSIN.

SOLENOID BRAKE.

Application filed April 14, 1926. Serial No. 101,971.

This invention relates to improvements in solenoid operated brakes of the type wherein the energization of the solenoid functions to release a normally "set" brake shoe.

Brakes of this general type have long been used in connection with motor driven apparatus of various kinds and particularly under conditions where it is desired to secure a quick and positive braking of the motor shaft immediately upon deenergization of the motor, and an equally rapid and positive release of the brake from the shaft upon an energization of the motor. Such results may be accomplished either by connecting the operating solenoids of the brake in series or in parallel with the motor armature or stator circuits or by maintaining the brake circuit independent of the motor circuit and providing convenient means for energizing and deenergizing the solenoid simultaneously with the armature of the motor. In either of these arrangements, and particularly under conditions where the driving motor is started and stopped at frequent intervals, considerable objection has been found to the "hammer blow" or impact between the armature and core of the solenoid, each time the brake is released. Not only does this impact or "hammer blow" give rise to considerable noise, which is objectionable, but in installations of high powered motors where the load is heavy and the brake setting springs correspondingly stiff, each impact violently jars the whole brake rigging, causing a rapid deterioration and wear of the links and parts thereof. In addition to this, the contacting faces of the armature and core, which take the full and direct force of each impact, soon become badly mutilated, which results in uncertain and defective operation of the brake due to the sticking of the mutilated parts. Furthermore, the sharp edges of metal turned up by the repeated blows of the armature frequently rupture the insulation of the solenoid winding which results in a short circuit and burned out brake winding.

With these facts in mind, the present invention seeks to provide a brake of this general type, so designed as to reduce the "hammer blow" or impact of the armature to a minimum.

A further object of the invention is to provide a single energizing coil for the brake in contrast to the usual two-coil brakes. This not only greatly simplifies the operation of installation and connection in any given instance, but also renders possible a novel arrangement of the coil and armature so that the latter is self-aligning with respect to the core, thus insuring free movement of the movable parts of the solenoid and a substantially uniform surface contact between these elements.

These and other objects of the invention will become apparent from a reading of the following specification, taken in connection with the accompanying drawings wherein several forms of the invention are illustrated and wherein.

Figure 1:
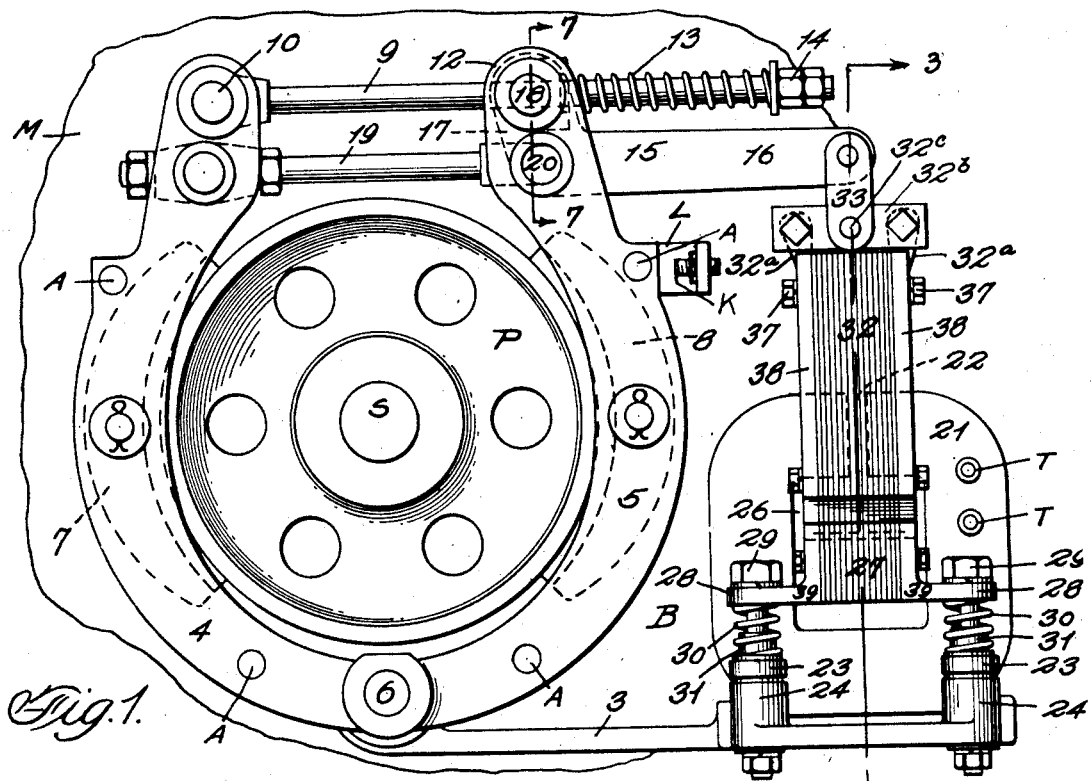
Figure 1 is a side elevation of the brake applied to a motor shaft.
Figure 2:
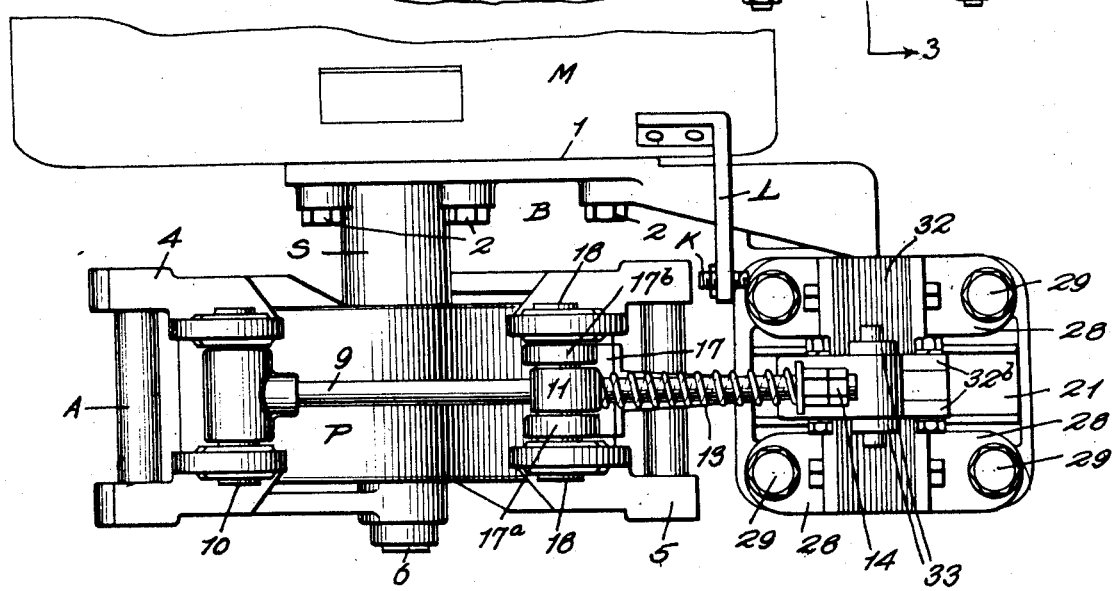
Fig. 2 is a top plan view of the apparatus shown in Fig. 1.

Referring more in detail to the accompanying drawings, wherein like reference numerals designate like parts throughout, M is an electric motor or other piece of rotating apparatus, the rotation of which is to be controlled. An appropriately designed supporting bracket B is attached to the motor casing in any convenient manner and is so arranged as to support the brake rigging and solenoid in operative position with respect to the shaft S, the rotation of which is to be controlled. The bracket B is formed with a vertically disposed attaching wing 1 secured to the motor casing M by suitable bolts or screws 2, and a substantially horizontal wing or shelf portion 3 designed to support the brake solenoid in a manner to be hereinafter described. The shaft S is provided with a brake pulley P and surrounding the pulley is a pair of arcuately formed complemental brake shoe hangers 4 and 5. The hangers 4 and 5 are pivotally supported in operative position with respect to the pulley P upon a bolt or pin 6 detachably but rigidly carried by the bracket B. In order to facilitate assembling the shoe hangers with the brake shoes and other brake rigging to be hereinafter described, the hangers are preferably each made in two complemental sections secured together by suitable pins or bolts A, as shown in Figs. 1 and 2. Complemental brake shoes 7 and 8 are pivotally mounted upon the hangers 4 and 5 at points upon the horizontal center line through the shaft S and said shoes are arcuately formed to conform to the curvature of the pulley P. The shoes 7 and 8 may be lined with any desired antifriction material, such as wood, fibre, fabric or the like.

A tie rod or connecting rod 9 is provided at the upper ends of the hangers 4 and 5, said rod being pivotally mounted in the upper extremity of the hanger 4 by means of a suitable pin 10, and extends therefrom transversely of the shaft S into sliding engagement with a trunnion block 11 pivotally mounted in the upper extremity 12 of the hanger 5. A coil spring 13 is mounted upon the rod 9 beyond the block 11 and is confined thereon under any desired degree of tension by means of a nut 14 adjustably mounted upon the extremity of the rod 9. From this construction it is apparent that the tension of the spring 13 serves to urge the upper extremities of the hangers 4 and 5 together, thereby functioning to normally retain the brake shoes 7 and 8 in operative engagement with the brake pulley P.

Figure 7:
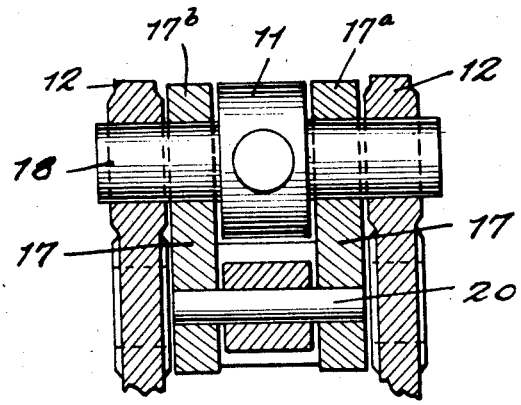
Fig. 7 is an enlarged detail view partly in section taken on the line 7—7 of Fig. 1.

A bell crank lever 15 is provided for releasing the shoes 7 and 8 from engagement with the pulley P when desired. The bell crank lever 15 comprises a long arm 16 and a short arm 17, the latter being bifurcated or yoke-shaped to provide spaced lugs 17$^a$ and 17$^b$, as clearly shown in Figs. 2 and 7. The lever is pivotally supported from the pins or trunnions 18 carried by the block 11, said trunnions providing a common pivotal connection between the hanger 5, the block 11 and the bell crank 15, the lugs 17$^a$ and 17$^b$ of the latter straddled or spanning the block 11, as clearly shown in Figs. 2 and 7. A second rod or link 19 is provided immediately below the rod 9, said second rod being pivotally mounted at the upper extremity of the hanger 4 just below the pivotal connection of the rod 9 therewith. The pivotal connection of the rod 19 with the hanger 4 is preferably made adjustable by means of a trunnion block to which the rod 19 is adjustably secured, this construction being clearly shown in Fig. 1. The opposite end of the rod 19 is provided with a pin or trunnion 20 by which said rod is pivotally attached to the bell crank 15 at the elbow thereof, it being noted in this connection that the pin 20 by which the link 19 and the bell crank 15 are connected, has no connection with the hanger 5. If desired the hanger 5 may be apertured at a point coinciding with the pin 20 for the purpose of facilitating the insertion and removal of said pin. By this arrangement it is apparent that a downward force exerted upon the extremity of the arm 16 of the bell crank 15 will cause said lever to turn clockwise about the pins 18, thus putting the rod 19 under compression against the tension of the spring 13, which, due to the sliding connection between the rod 9 and the block 11, causes a separation of the hangers 4 and 5 to move the shoes 7 and 8 out of engagement with the pulley P as the applied force overcomes the tension of the spring 13. By reason of the adjustability of the rod 19 and the tension of the spring 13, it is apparent that the shoes 7 and 8 may be adjusted to compensate for the wear of the latter, and to maintain the same in operative position with respect to the pulley P at all times.

In order to limit the outward movement of the shoes 7 and 8, an adjustable stop K is provided, said stop being carried by a suitable bracket arm L, secured to the motor casing M.

The bell crank 15 is designed to be controlled by a solenoid, the energization of which functions to move the arm downwardly to release the brake shoes in the manner above indicated. The solenoid comprises a bobbin or spool 21, made of brass, copper, or other non-magnetic material, said bobbin being provided with a suitable air gap 22 and supported by lugs 23 formed integral with the bobbin. The bobbin lugs 23, preferably four in number, rest upon suitable upstanding bosses 24, carried by the shelf 3 of the bracket B. The solenoid bobbin 21 is formed similar to a spool, having wide end flanges F—F, designed to provide a protected groove for the winding W, and a large central opening 26 through which extends the core 27 of the solenoid. The core 27 is provided with convenient supporting lugs 28, said lugs being apertured and so arranged as to coincide axially with the apertured bosses 24 of the bracket and the lugs 23 of the bobbin, whereby bolt members 29 may be entered through the core lugs 28, bobbin lugs 23 and bracket bosses 24. On each of the bolts 29 there is a coil spring 30 interposed between the core lugs 28 and bobbin lugs 23, and also a limit or guard sleeve 31. By this arrangement one set of bolts may be utilized to support the bobbin from the bracket and the core axially within the bobbin. The particular function of the springs 30 and the sleeves 31 will be hereinafter fully explained.

An armature 32 is provided to cooperate with the solenoid and core just described, whereby the magnetic force of the solenoid may function to mechanically release the brake shoes. To this end the armature 32 is provided with supporting lugs or ears 32$^a$ to which are secured cross bars 32$^b$. The cross bars 32$^b$ are centrally apertured to receive a pivot pin 32°, said pin carrying a pair of pivoted links 33 by which the armature is pivotally suspended from the extremity of the long arm 16 of bell crank lever 15. By this arrangement an exceedingly flexible support is provided for the armature which insures a uniform contact between the pole faces thereof and the core when the solenoid is energized.

It is to be noted that the armature 32 is substantially U-shaped and straddles the bobbin 21, legs thereof extending on opposite sides of the bobbin into operative position with respect to the extremities of the core 27 which project axially from the bobbin. By this arrangement not only is the armature rendered self-aligning with respect to the core 27, but due to the novel disposition of the bobbin between the legs of the armature, the bobbin winding is entirely protected from injurious contact with the armature, thus precluding all possibility of short circuiting due to the wearing away or rupture of the insulation of the winding W. Furthermore, the resilient mounting provided by the springs 30 for the core 27, insures a substantial diminution of the shock and noise incident to the impact between the armature and core when the winding W is energized.

Figure 3:
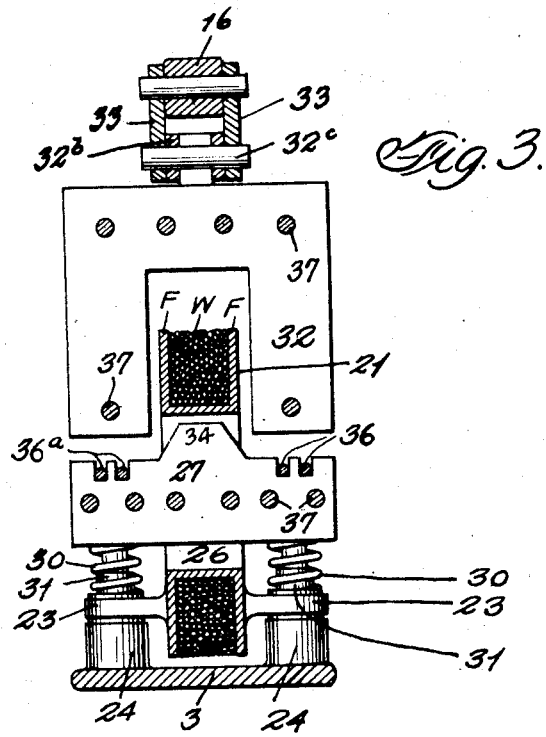
Fig. 3 is a vertical sectional view taken on the line 3—3 of Fig. 1.

To further reduce the shock or impact between these parts, the magnetic circuit of the solenoid is so designed as to provide a leakage flux path which is of a maximum length and, therefore, of minimum strength when the armature and core are farthest apart, and which path rapidly decreases in length and therefore increases in strength as the armature approaches the core, when the solenoid is energized. This result is obtained by providing the core 27 with a central boss or projection 34, tapered in cross section from the maximum at the base to a minimum at its free extremity. As shown more clearly in Figs. 3 and 5, the projection 34 is preferably formed integral with the core 27 and arranged so that its free extremity normally extends between the depending legs of the armature 32. This provides two substantially equal magnetic flux leakage paths between the legs of the armature and the boss or projection 34, which paths, due to the tapering character of the boss, rapidly diminish in length as the armature approaches the core, with the result that a gradually increasing amount of the flux is by-passed from the effective air gaps of the magnet to the leakage flux paths thereby reducing the normal tendency of the attractive force between the core and armature to increase as these elements move together. This action tends to minimize the usual heavy impact between the core and armature which results from the maximum attractive force between these elements during their final stages of approach when no distribution of the flux as above described obtains. By this arrangement a maximum attractive force is provided at the initial stages of energization to overcome the inertia of the brake rigging and set the parts thereof in motion, and this force is gradually reduced due to the increase in the leakage flux, with the result that when the armature strikes the core the force of the blow is substantially reduced. It is apparent, however, that immediately upon contact between the armature and core, substantially the entire magnetic flux from the solenoid becomes active to retain these parts in engagement. A further magnetic cushioning of the blow is realized, due to the novel mounting of the core 27, it being apparent that as the impact of the blow, however great or small it may be, is absorbed by the springs 30, the resulting movement of the core away from the magnetic center of the bobbin 21 is resisted by the flux of the coil W. The sleeves or collars 31 mounted upon the bolts 29, are for the purpose of limiting the downward movement of the core member 27.

Figure 6:
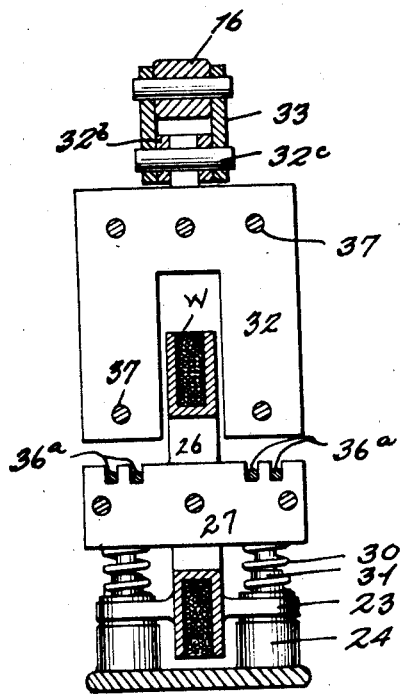
Fig. 6 is a sectional view of a modification of the solenoid and its magnetic circuit, corresponding to Fig. 3.

In Fig. 6 is shown a slightly modified arrangement of coil, core and armature, by which substantially the same results as above described may be realized without the use of the tapered projection on the core. In this form of the invention, the bobbin 21 is made substantially narrower for the purpose of permitting the armature to be formed with the legs thereof in close proximity one to the other. By this arrangement a leakage flux path is established transversely between the legs of the armature and this path functions to produce substantially the same magnetic cushioning of the parts realized in connection with that form of the invention shown in Fig. 3.

Figure 4:
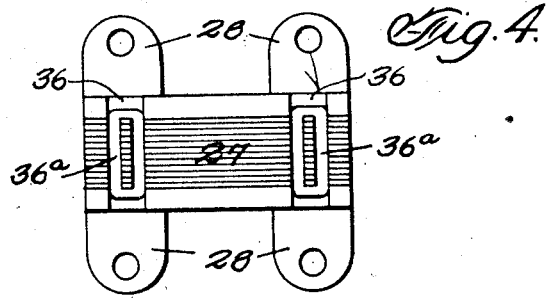
Fig. 4 is a top plan view of the magnet core.

The solenoid is particularly adapted for use in connection with alternating current installations, and to this end the armature 32 and the core 27 are illustrated in the drawings as built up of a plurality of laminations of suitable magnetic material. The laminations of the core 27 are each provided with a plurality of notches 35, designed when assembled to form coil grooves in the face of the core for the reception of shading or dampening coils 36', positioned in the pole faces of the core member as shown more clearly in Fig. 4. These coils are each formed of a single short-circuited convolution of heavy gage wire, and by reason of the currents induced in them, function to hold the armature and core together during the zero period of the alternating current cycle and thus prevent chattering of the magnet.

The laminations of the core member 27 and of the armature 32 are preferably secured by suitable bolts or rivets 37, between plates 38 and 39, respectively, formed of non-magnetic material, the plates 38 carrying the ears 32ª and the plates 39 carrying the lugs 28, by which the armature and core are supported from the bell crank 15 and the bracket B, respectively. This arrangement effectively insulates the magnetic circuit of the solenoid from the brake rigging and supporting bracket.

Figure 5:
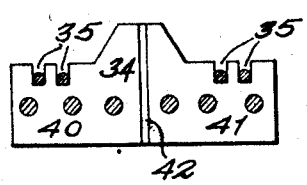
Fig. 5 is a detail sectional view of a modified form of core.

The core member 27 may be constructed with the laminations thereof, each made up of two substantially identical sections 40 and 41, as shown in Fig. 5, and arranged in spaced relation whereby to form a small transverse air gap 42 in the core, it being apparent that the plates 39 of the core member provide means for so forming and disposing the laminations in spaced relation. By this arrangement all possibility of defective or sluggish operation of the brake, due to residual magnetism is substantially precluded, it having been found that the provision of a fixed and constant air gap in the magnetic circuit of the solenoid reduces the residual magnetism to a substantially negligible quantity.

It is, of course, apparent that the brake and solenoid as hereinbefore described, and the principles incorporated therein, are equally available to direct and alternating current installations, it being obvious, of course, that in direct current installations, there is no need for laminating the magnetic structure of the solenoid, or for providing the shading or dampening coils in the pole pieces of the core.

The winding W of the solenoid may be energized from any convenient source of electric potential through the terminals T, the ends of the widing W for this purpose being carried through the bobbin flange F in any convenient manner.

In the operation of the improved brake herein described, the solenoid winding W when energized, sets up a powerful magnetic field through the core 27, said field completing its circuit through the armature 32. Under the influence of this magnetic force, the armature is attracted to the core carrying the lever 16 downwardly, this movement functioning to release the brake shoes 7 and 8 against the tension of the spring 13 to allow free rotation of the shaft S. Upon deenergization of the winding W the spring 13 comes into play to set the brake shoes into engagement with the pulley P. By means of the flux leakage paths provided by the projection 34 of the magnet core, coupled with the resilient mounting of said core and the magnetic resistance to its movement during shock absorbing periods, the noise and the shock of the impact between the core and the armature are rendered substantially negligible.

Having thus described my invention, it is apparent that a single coil solenoid operated brake has been provided having self-aligning armature and core and with positive means for magnetically and mechanically cushioning the force of the impact between these elements. Furthermore, the improved brake is equally adapted for alternating current and direct current installations, special provision having been made in the former case for preventing uncertain operation of the brake, due to residual magnetism and for holding the brakes released during zero periods in the alternating current cycle, and for preventing chattering during periods when the brake is energized. However, it is to be understood that the foregoing description and the accompanying illustrations of several forms of the brake are for the purpose of explanation only, and not as defining the limits of the invention, which are to be determined from the scope of the appended claims.

Having thus described my invention what I claim as new is:

1. An electro-magnet comprising a solenoid, a core member and an armature member associated therewith and mounted for relative movement toward one another when the solenoid is energized, one of said members being resiliently mounted to yield under the impact, of the other and to move laterally of the path of flux through the solenoid, to magnetically cushion the force of the impact.

2. An electro-magnet comprising a solenoid, a core member and an armature member associated therewith and movable relative to each other, one of said members being mounted for limited movement laterally of the magnetic field of the solenoid under impact to cushion the force of the impact between said members when the solenoid is energized.

3. An electro-magnet comprising a solenoid, a core member mounted axially thereof, a movable armature member associated with the solenoid and designed to move into engagement with the core member when the solenoid is energized, said core member being mounted for limited lateral movement with respect to the flux path through the solenoid under impact of the armature whereby to magnetically cushion the force of said impact.

4. An electro-magnet comprising a solenoid bobbin, a core member mounted axially thereof, a substantially U-shaped armature straddling the bobbin in operative relation with the core member and movable toward the latter when the solenoid is energized, said core member being mounted for limited movement laterally of the axis of the solenoid under impact of the armature to magnetically cushion the force of the impact.

5. An electro-magnet comprising a solenoid, a movable armature associated therewith, and a core member extending longitudinally through the solenoid, said core member mounted to move in opposition to the attractive force of the solenoid under impact of the armature to cushion the force of said impact when the solenoid is energized.

6. An electro-magnet comprising a solenoid, a movable armature associated therewith, and a core member resiliently mounted axially of the solenoid and designed to yield laterally under impact of the armature to reduce the force of said impact when the solenoid is energized.

7. An electro-magnet comprising a solenoid, a movable armature associated with the solenoid, and a core member resiliently mounted within the solenoid and extending longitudinally therethrough, said core member mounted to move in opposition to the tension of its resilient mounting and the attractive force of the solenoid under impact of the armature to reduce the shock of said impact when the solenoid is energized.

8. An electro-magnet comprising a solenoid, a core member mounted axially thereof, a substantially U-shaped armature straddling the solenoid in operative relation with the core, said armature mounted to move rectilinearly toward the core when the solenoid is energized, and a projection carried by the core intermediate its ends and extending between the legs of the armature.

9. An electro-magnet comprising a solenoid, a core member mounted axially thereof, a U-shaped armature straddling the solenoid in operative relation to the core member, a tapered projection carried by the core member and extending between the legs of the armature, said armature being mounted for substantially rectilinear movement toward the core when the solenoid is energized, whereby to correspondingly vary the leakage flux paths defined by said tapered projection.

10. An electro-magnet comprising a solenoid, a core member mounted axially thereof and having a tapered projection intermediate its ends, and a U-shaped armature straddling the solenoid and core projection whereby to define substantially equal leakage flux paths between said projection and the legs of the armature, said armature being mounted for movement in a substantially rectilinear path when the solenoid is energized to simultaneously and correspondingly vary the length of said leakage flux paths.

11. An electro-magnet comprising a U-shaped armature, a solenoid bobbin mounted to extend between the legs thereof, and a core member mounted axially of the solenoid and extending therefrom into operative relation with the legs of the armature, said armature being mounted for substantially rectilinear movement toward the core when the solenoid is energized.

12. An electro-magnet including a bifurcated armature and a core member mounted for relative movement in a substantially rectilinear path, said core member being provided with an upstanding boss extending between the legs of the armature and tapered uniformly with respect thereto.

13. An electromagnet comprising a solenoid bobbin, a support therefor, bolt members carried by the support, apertured supporting lugs carried by the bobbin and engaging the bolt members, a core extending axially through the bobbin, apertured lugs carried by the core and slidingly engaging the bolt members, coil springs mounted upon the bolt members between the lugs of the bobbin and the lugs of the core whereby to resiliently support the core within the bobbin.

14. An electromagnet of the character described in claim 13, wherein is included an armature movable toward the core when the solenoid is energized, and means carried by the bolt members to limit the movement of the core member on said bolts due to the impact between the armature and core.

15. An electromagnet comprising an armature having a plurality of substantially parallel legs, a solenoid bobbin mounted to extend between two of said legs, a core member extending axially through the bobbin and terminating adjacent the extremities of the armature legs, and means associated with the core and armature for defining a leakage flux path therebetween.

16. An electromagnet comprising an armature provided with a plurality of substantially parallel legs, a solenoid bobbin mounted to extend between two of said legs, and a core member extending axially through the bobbin and protruding substantially equal distances therefrom at both ends, whereby to render the armature self-aligning with respect to the core member when the solenoid is energized.

17. An electromagnet comprising an armature provided with a plurality of substantially parallel legs, a solenoid bobbin mounted to extend between two of said legs, and a core member mounted axially of the bobbin, and laterally movable within predetermined limits whereby to render the core self-aligning with respect to the axis of the solenoid when the solenoid is energized.

18. An electromagnet of the character described in claim 17 wherein means are associated with the core and armature for defining a variable flux leakage path between these members.

19. An electromagnet comprising an armature having a plurality of substantially parallel legs, a solenoid bobbin mounted to extend between two of said legs, a core member mounted axially of the bobbin with its opposite ends extending therefrom substantially equal distances into operative position with respect to the legs of the armature whereby to render the armature self-alining with respect to the solenoid, the core member being mounted for limited lateral movement within the solenoid whereby to render it self-alining with respect to the axis of the solenoid.

20. An electromagnet of the character described in claim 19 wherein additional means are associated with the core and armature for defining a variable flux leakage path between these elements.

21. An electromagnet including a bifurcated armature and a core member mounted for relative movement in a substantially rectilinear path, said core member being provided with an upstanding boss or projection extending between the legs of the armature.

22. An electromagnet including a bifurcated armature and a core member, an upstanding boss or projection on the core member intermediate its ends and extending between the legs of the armature, and a fixed air gap extending transversely of the core member.

23. An electromagnet including a bifurcated armature and a core member, an upstanding boss or projection on the core member intermediate its ends and extending between the legs of the armature, said boss being divided by a fixed air gap extending transversely of the core member.

24. An electromagnet including a bifurcated armature and a core member, said core member being provided with a fixed transverse air gap, and shading coils embedded in the core member between the air gap and the extremities of the core.

25. An electromagnet including a bifurcated armature and a core member, a tapered boss or projection on the core member intermediate its ends and extending between the legs of the armature, a fixed air gap dividing the boss or projection transversely, and shading coils embedded in the core member between the boss and the extremities of the core.

In witness whereof, I hereto affix my signature.

GEORGE J. LEXA.